UNITED STATES PATENT OFFICE.

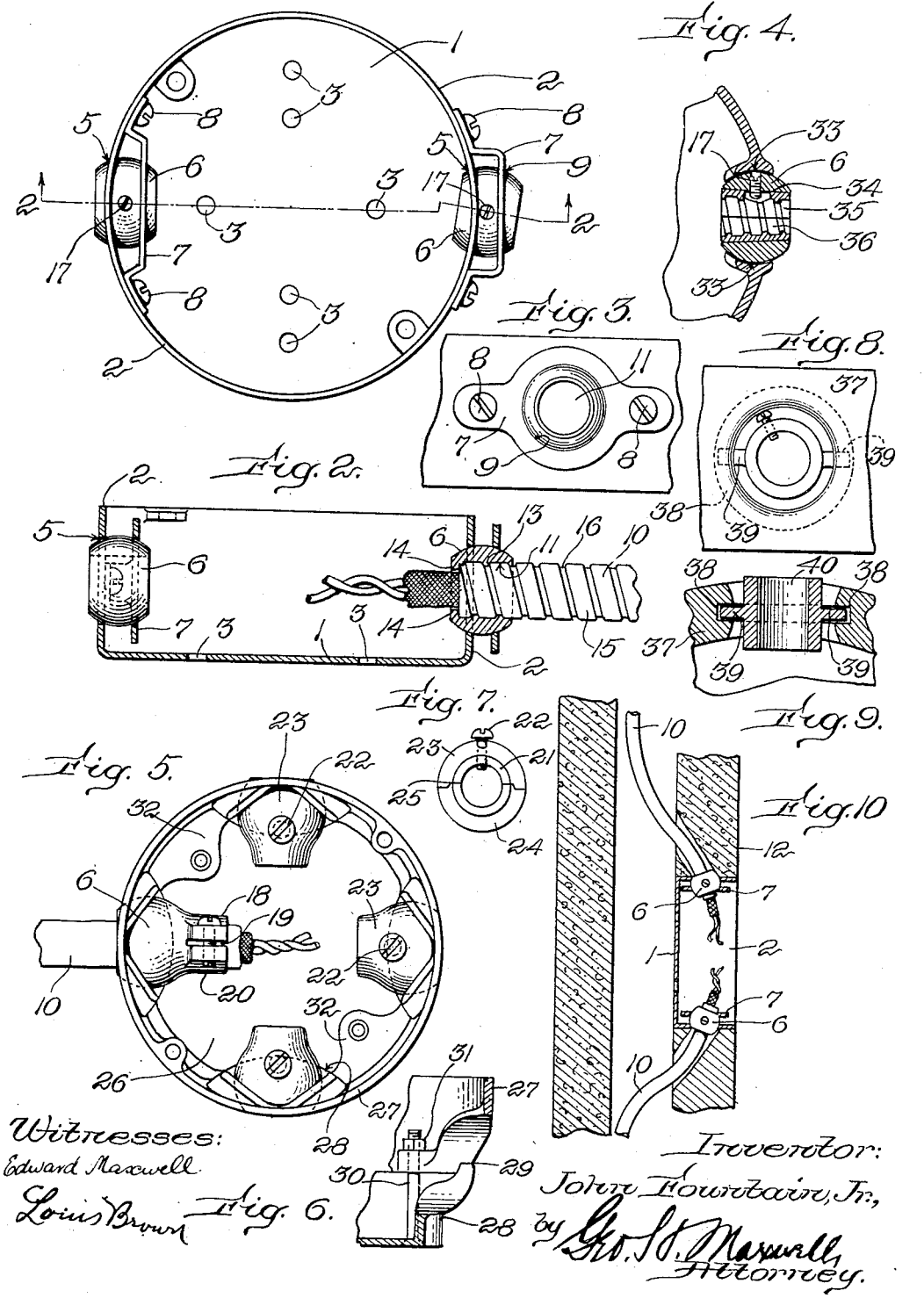
J. FOUNTAIN, Jr.
OUTLET BOX FOR ELECTRIC WIRES.
APPLICATION FILED AUG. 3, 1908.
905,066.
Patented Nov. 24, 1908.

JOHN FOUNTAIN, JR., OF ELIZABETH, NEW JERSEY, ASSIGNOR TO SEARS B. CONDIT, JR., OF BOSTON, MASSACHUSETTS.

OUTLET-BOX FOR ELECTRIC WIRES.

No. 905,066.    Specification of Letters Patent.    Patented Nov. 24, 1908.

Application filed August 3, 1908. Serial No. 446,523.

*To all whom it may concern:*

Be it known that I, JOHN FOUNTAIN, Jr., a citizen of the United States, residing at Elizabeth, in the county of Union and State of New Jersey, have invented an Improvement in Outlet-Boxes for Electric Wires, of which the following description, in connection with the accompanying drawings, is a specification, like letters on the drawings representing like parts.

In wiring buildings and the like, outlet boxes are commonly used for receiving the ends of the electric wires which are to be connected thence with a fixture or the like and as heretofore made, it has been exceedingly difficult to get the wires into the boxes properly because the construction of the boxes has required that the wire or cable should be bent more decidedly than its nature has readily permitted. This is especially true with certain of the best kinds of armored conduit in which the insulated electric conductor is enveloped in a steel wound jacket capable of ordinary and very limited bending.

Accordingly my present invention has for its object the provision of an outlet box provided with connectors capable of moving angularly in their sockets in the walls of the box so as to accommodate themselves to the general direction of the wire, thereby obviating the necessity of bending the latter as much as has usually been heretofore necessary. To this end, I provide the outlet box with movable connectors preferably universally movable, like a ball and socket joint, said movable connectors having means for clamping or otherwise holding and retaining the wires so that the free ends of the latter may project within the box in usual manner.

I consider my invention as broadly new in the provision of an outlet box having connectors capable of moving angularly with relation to the wall of the box through which it is desired that the electric conductor wire shall pass.

The constructional details of my invention will be pointed out at length in the course of the following description taken with reference to the accompanying drawings in which I have illustrated a number of embodiments of the invention.

In the drawings: Figure 1 is a top plan view of my invention applied to a standard outlet box; Fig. 2 shows my improved outlet box in transverse section taken on the irregular line 2—2, Fig. 1; Fig. 3 is a fragmentary detail showing the movable connector and adjacent parts in front elevation; Fig. 4 is a transverse sectional view showing the same general construction slightly modified; Fig. 5 is a top plan view of a special outlet box cast in two sections and provided with approximately ball connectors; Fig. 6 is a partial vertical sectional view thereof showing the separable sections of the box, shown in Fig. 5; Fig. 7 is an end view of one form of connector; Figs. 8 and 9 show respectively in front elevation and transverse section a tubular-trunnion arrangement of connector; and Fig. 10 is a sectional view illustrating the general purpose and use of my invention.

As already intimated, I consider that my invention is broadly new and accordingly, viewed in its broader aspects, it will be understood that I am not limited to any particular shape or construction of the box proper.

Referring to my preferred construction, Figs. 1—3, it will be seen that I have shown a usual standard outlet box commonly stamped out of sheet steel having a bottom 1 and rim 2 and provided with screw holes 3 by which it may be fastened to the wall, floor or other position of use. Holes 5 are provided in the walls 2, and mounted therein are ball-shaped connectors 6 having slightly larger diameter than the holes 5 so that they cannot pass through said holes, being retained permanently therein by any suitable means as by a plate or strap 7, shown as riveted or screwed at 8 to the adjacent wall 2 and provided with a circular hole 9, substantially alined with the hole 5 and preferably of approximately the same size. By this means the ball 6 is positively held against movement either in or out and yet is at all times perfectly free to rotate so as to receive a cable 10 through the central axial opening 11 thereof at any angle desired with relation to the box. For instance, in Fig. 10, I have illustrated one of my outlet boxes mounted in a wall 12 for receiving two cables 10 from which the convenience of my invention will be readily apparent as, instead of being obliged to bend the cables 10 at an awkward angle, the connectors 6 are simply turned into approximate alinement with said cables so that the latter are readily shoved through the central openings 11 of said connectors. The opening 11 of the connector 6 may have any internal surfaces desired, smooth or otherwise, according to the kind of cable with which it is used, but I prefer to provide the interior with coarse threads 13 and a stop or shoulder 14 at the inner end for the armor 15 of the cable 10 to abut against, said threads 13 corresponding to the usual wind or groove 16 of the armor. Thus the cable may be held with absolute certainty and permanency simply by relatively turning or rotating the connector 6 and the cable until they are firmly screwed together. For still greater precaution, I have shown a set screw 17 mounted in the wall of the connector 6 to be screwed against or into the cable after the latter has been put in place.

In Fig. 5, I have shown the connector as provided with a protuberant flange or neck 18 split at 19 where it is provided with a clamping bolt or screw 20 for clamping the cable end, and in Fig. 7, I have shown a somewhat similar connector whose neck 21 is provided with a set screw 22, substantially the same as 17, said connector being made in two halves 23, 24, interlocked along the irregular joint 25, said construction permitting the two halves of the connector to be placed on opposite sides of the cable and brought together into interlocking position, thereby tightly clamping the cable. For this purpose the outlet box 26 is made in two parts, a top ring 27 and a back part 28, uniting at 29 horizontally along the diameter of the openings in which the universally movable connectors are mounted, said parts being joined by bolts 30 and nuts 31, the latter bearing against ledges 32.

In Fig. 4, I have shown a connector as embraced by a cast socket 33, said connector having a slightly conical opening 34 retaining similarly conical clamping plates 35, 36. In the use of this form of my invention, the cable is first slipped through the opening 34 beyond its armor position, whereupon the plates 35, 36, are placed tightly around the inner projecting end of the cable close to the ball 6 and then the cable is pulled back sufficiently to bring the outer conical surfaces of the plates 35, 36, tightly against the corresponding surface 34 of said ball 6. Thereupon the set screw 17 is tightened against the cable which is then immovable.

In Figs. 8 and 9, I have shown a further embodiment of my invention in which the box is provided with a wall 37 sufficiently thick to contain recesses 38 which receive the trunnions 39 of a sleeve or tube 40, thereby permitting the latter to rock angularly on said trunnion with relation to the outlet box. By having the recesses 38 extended up and down and preferably around in a complete circle as indicated in Fig. 8, this trunnion construction permits of universal tipping movement the same as in the ball and socket construction shown in the other embodiments of my invention herein set forth.

It will be understood that I have by no means attempted to show all the possible or contemplated embodiments of my invention, but have shown a number of preferred embodiments in order to bring out clearly the broad nature and scope of my invention, as I believe that I am the first to have provided an outlet box having angularly movable cable-connectors so that instead of requiring the cable to be bent arbitrarily into alinement with a fixed connector, the connector is turned into alinement with the cable. This makes it possible to use a stiff, tight, steel-armored cable with practically the same freedom and convenience as an inferior but more flexible ordinary cable. The great advantage of said steel-armored cables is thoroughly understood and appreciated by the trade, but the difficulty of bending them has hindered their use, and one purpose of my invention is to make the use of these desirable cables just as feasible and easy as the use of less durable and advantageous cables.

In use, the outlet box is set into the wall the same as heretofore, for instance as shown in Fig. 10, at the place where the wires are to be brought out. Thereupon the connectors are turned to whatever angle will best facilitate the placing therein of the cables. If the preferred form, in which the connector internally threaded, as shown best in Fig. 2, is used, the cable is screwed into the connector, or rather the latter is rotated on the cable until the latter strikes against the stops 14. If a smooth bolt connector is used, the cable is fastened therein by a set screw or by the split end as shown at 18—20, Fig. 5, and if the trunnion form of my invention is used, the trunnions 39 are first turned to such a position as to permit the tubular part 40 to swing at the right angle, whereupon it is turned upon its trunnions, and the cable is put in place and clamped. My invention not only facilitates the use of extra stiff cables, but relieves the workman of much labor, saves undue injury of the plaster and makes a positive tight, simple joint.

In the claims, by the word "conductor" I expressly include any and all conducting means of a pipe-like or wire-like nature, whether hollow pipes such as any known in the trade as conduits, or insulated wires, or the wires themselves, or pipes, or armored conductors, metallic or non-metallic, and whether flexible or not flexible.

Having described my invention, what I claim as new, and desire to secure by Letters Patent of the United States, is:

1. An outlet box for electric wires, comprising a box portion, and a connector movably mounted in the wall of said box to turn angularly thereto for receiving a conductor at varying angles as desired.

2. An outlet box, combined with a connector, permanently mounted in the wall of said box to turn freely at varying angles thereto, said connector having an axial passage for the electric conductors, and means for retaining the latter.

3. An outlet box, combined with a transversely apertured connector mounted in its wall to turn freely in all directions for receiving an electric conductor.

4. An outlet box, a connector mounted to turn angularly in the wall of said box, said box having provision for retaining said connector while still permitting it to turn freely, said connector having a transverse opening for a conductor, internally threaded to interlock with said conductor for holding the latter against endwise movement.

5. An outlet box, a connector mounted to turn angularly in the wall of said box, said box having provision for retaining said connector while still permitting it to turn freely, said connector having a transverse opening for a conductor, and a stop adjacent its inner end for limiting the inward position of said conductor.

6. An outlet box, a connector mounted to turn angularly in the wall of said box, said box having provision for retaining said connector while still permitting it to turn freely, said connector having a transverse opening for a conductor, and means for clamping said conductor in said connector.

7. An outlet box, a connector mounted to turn angularly in the wall of said box, said box having provision for retaining said connector while still permitting it to turn freely, said connector having a transverse opening for a conductor, a stop adjacent its inner end for limiting the inward position of said conductor, and a set screw for clamping said conductor in said connector.

In testimony whereof, I have signed my name to this specification, in the presence of two subscribing witnesses.

JOHN FOUNTAIN, JR.

Witnesses:
M. J. SPALDING,
LOUIS BROWN.